Figure 1:
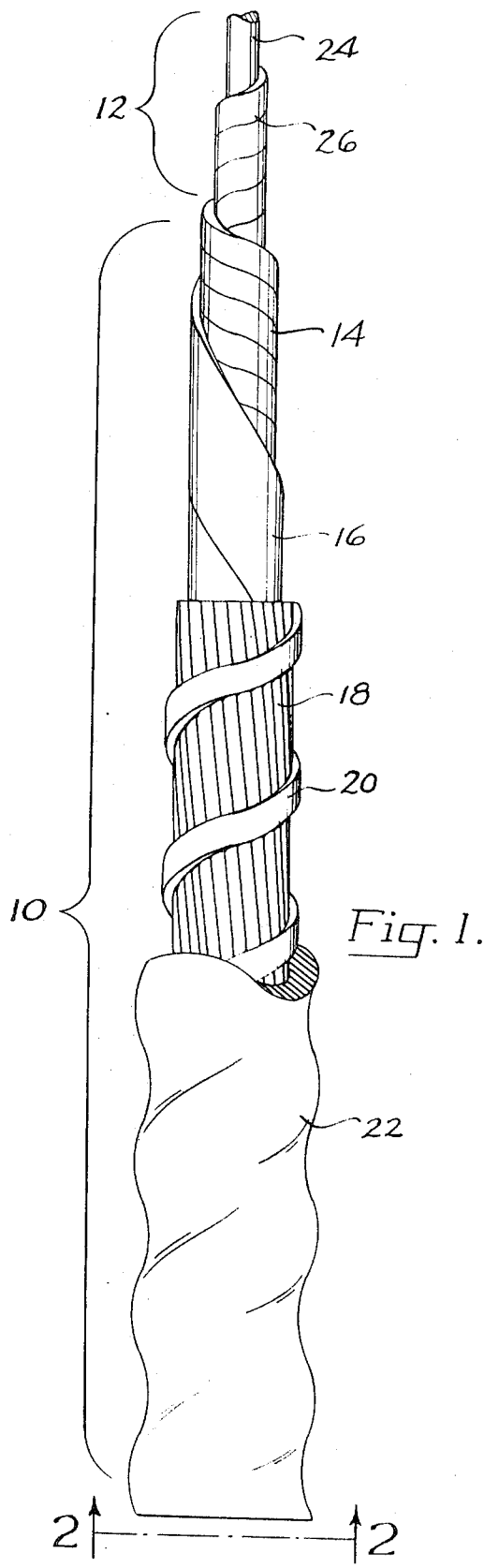

United States Patent

[11] 3,584,518

| [72] | Inventor | John B. Hurlow<br>2616 W. Parkway Drive, Tacoma, Wash. 98466 |
|---|---|---|
| [21] | Appl. No. | 797,867 |
| [22] | Filed | Feb. 10, 1969 |
| [45] | Patented | June 15, 1971 |

[54] PUSH-PULL, CABLE-TYPE ACTUATOR FOR USE AT HIGH TEMPERATURES
8 Claims, 2 Drawing Figs.

| [52] | U.S. Cl. | 74/501 |
|---|---|---|
| [51] | Int. Cl. | F16c 1/10 |
| [50] | Field of Search | 74/501, 501.5, 502; 138/130, 131, 134, 135; 148/142 |

[56] References Cited
UNITED STATES PATENTS

| 3,355,333 | 11/1967 | Haynes et al. | 148/142 |
| 630,637 | 8/1899 | Shndah | 74/501 |
| 1,951,723 | 3/1934 | Burd et al. | 74/501 |
| 3,013,443 | 12/1961 | Morse | 74/501 |
| 3,015,969 | 1/1962 | Bratz | 74/501 |

Primary Examiner—William F. O'Dea
Assistant Examiner—Wesley S. Ratcliff, Jr.
Attorney—Eugene D. Farley

ABSTRACT: A push-pull, cable-type actuator for use at high temperatures comprises a flexible metal sheath and a flexible metal core mounted for sliding longitudinal movement in the sheath. The sliding surfaces of both sheath and core are comprised of a precipitation hardening steel fabricated in a soft condition and hardened by swaging and heat treating to a condition in which the meeting, rubbing surfaces will not spall during use of the actuator at high temperatures.

PATENTED JUN 15 1971

3,584,518

John B. Hurlow
INVENTOR
BY
Eugene O. Farley
Atty.

PUSH-PULL, CABLE-TYPE ACTUATOR FOR USE AT HIGH TEMPERATURES

This invention relates to push-pull, cable-type actuators (push-pull cable controls) for use at high temperatures.

Although push-pull cable controls are well known, none presently available is suited for use in applications such as the thrust cables employed for controlling jet aircraft engines, where high temperatures and heavy loads prevail during operation of the control. In such applications, the available push-pull cables fail after relatively short operating periods because of galling resulting from exposure to the high temperatures of their operating environment followed by pronounced spalling. In other words, at high operating temperatures, the sliding surfaces of the cable components are subject to localized welding together of the moving parts, followed by cracking and flaking upon forcibly breaking apart the welded areas.

It is the general object of the present invention to provide a push-pull, cable-type actuator in which the foregoing problem is overcome, wherein the moving components do not gall and spall over long operating periods at high temperatures, i.e. at temperatures of the order of 1000° F., and wherein the cable maintains its original strength.

Still a further object of the present invention is the provision of a high temperature, push-pull, cable-type actuator which is highly flexible, has a long service life, can be assembled in any required length, which is resistant to abrasion, which is resistant to the corrosive action of moisture, and which need be lubricated only once during its entire service life.

Figure 2:
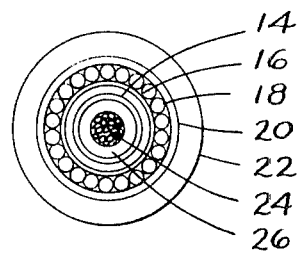

The manner in which the foregoing and other objects of the invention are accomplished will be apparent from the accompanying specification and claims considered together with the drawings, wherein:

FIG. 1 is a fragmentary view in plan of a length of the herein described actuator with the component layers partly broken away to reveal inner construction; and FIG. 2 is an end view of the actuator looking in the direction of the arrows of line 2—2 of FIG. 1.

In its broadest aspect, the presently described push-pull cable-type actuator for use at high temperatures comprises a flexible metal sheath and a flexible metal core mounted for sliding longitudinal movement in the sheath. The sliding surfaces of both sheath and core are comprised of a precipitation hardening steel fabricated in a soft condition and hardened by swaging and heat treating. This produces a condition in which the meeting rubbing surfaces will not gall and spall during use of the actuator at high temperatures under a heavy load.

Considering the foregoing in greater detail, and with particular reference to the drawings:

As is illustrated in the drawings, the actuator of my invention comprises a flexible metal sheath indicated generally at 10, and a flexible metal core, indicated generally at 12. The core is mounted for relative sliding longitudinal movement within the sheath.

Although the construction of the sheath may vary and still retain the concept of the invention, in the illustrated embodiment it is formed in five superimposed layers to produce a durable, heavy duty unit.

The innermost or core layer 14 is fabricated from space wound, flat, precipitation hardening steel. It is the sheath component which is in sliding contact with core 12.

The next component of the sheath comprises a moisture barrier 16 consisting of a suitable heat-resistant moistureproof plastic. It may comprise, for example, polyimide tape wound about inner member 14 in such a manner as to form a uniform moistureproof layer.

The next layer 18 comprises a plurality of wound wires spirally wound over the vapor barrier to provide the basic tensile and compressive strength of the conduit. These wires may comprise any of a number of types of stainless steel wires.

The next layer 20 comprises a stainless steel binder wire helically wound and swaged on top of the spirally wound strands. It has for its function providing the sheath with additional compressive strength.

If desired, an external covering 22 of asbestos or other high temperature material may be superimposed about the sheath. It provides protection against extreme environmental conditions and abrasion.

Sliding core member 12 comprises preferably an inner wire 24 of heavy enough gauge to withstand the applied load. It is encased in an outer wrapping 26 of metal armor swaged to the wire as required to keep it from unwinding during use. The armor imparts additional compressive strength to the core member.

During assembly of the cable, the usual fittings may be applied as required to provide a cable control suited to a particular function. Such fittings include a conventional sliding rod, a conduit end fitting, a support tube and seals of various categories.

Also, during assembly a suitable lubricant may be preloaded into the unit between the sliding core and the sheath. The lubricant may comprise any one of several types, a suitable one being composed of nickel and graphite with a hydrocarbon carrier. It is inserted as an ordinary grease and operates as a dry lubricant after exposure to temperatures in excess of about 600° F. The dry lubricant permeates the surfaces of the sliding members and provides good lubrication at elevated temperatures.

As indicated above, it is a particular feature of the herein described actuator that it is rendered nongalling at high temperatures. This is accomplished by fabricating the contacting components of the sheath and core of a metal which imparts the desired nongalling qualities to the final assembly. Such a metal comprises broadly any one of the precipitation hardening steels.

By definition a precipitation hardening steel is one which in its initial condition of manufacture is ductile and relatively soft so that it may be wrapped and spiralled as required to manufacture the cable. However, after manufacture it may be converted by swaging and heat treatment to a hard condition in which it still retains its ductility and without injuring or distorting the strands.

Preferably these two operations are carried out separately. The swaging operating is carried out first. It is followed by a heat treatment carried out at a temperature in excess of 600° F., preferably at a temperature between about 900° F. and 1500° F. for a time sufficient to effect the desired change in properties of the metal. The cable components thus may be swaged to the underlying components as they are applied, and the entire assembly subsequently heat treated as a unit.

The precipitation hardening steels which may be employed are of two types: the martensitic (maraging) steels and the austinitic steels.

A typical martensitic (maraging) steel contains, for example, from 10—30 percent by weight nickel, from 5—15 percent cobalt, from 1—10 percent molybdenum, and fractional parts of other elements, with the remainder being iron.

A typical austenitic steel contains, for example, from 18—21 percent by weight chromium, from 3—5 percent molybdenum, from 12—15 percent cobalt, from 2—4 percent titanium, up to 2 percent iron, fractional parts of aluminum, zirconium, boron, copper and carbon, and the balance nickel.

Another example is a cobalt-based steel containing from 5—15 percent iron, and fractional parts of other elements, the remainder being cobalt.

The actuators of the invention demonstrate properties in service never heretofore obtainable. Where the application of conventional actuators of the push-pull cable-type is limited to environments having temperatures of less than 400° F., the presently described units show superior performance under heavy loads at temperatures in excess of 900° F. In a typical test, a cable control of the invention showed a service life in excess of 14,000 complete 11 inch pull and push strokes at an average load of 350 pounds under a temperature of 900° F. This life is far in excess of that characteristic of any other known push-pull cable operating in the same environment.

It is to be understood that the form of my invention herein shown and described is to be taken as an illustrative example of the same and that various changes in the shape, size and arrangement of parts may be resorted to without departing from the spirit of my invention or the scope of the subjoined claims.

Having thus described my invention, I claim:

1. A push-pull, cable-type actuator for use at high temperatures, comprising:
    a. a flexible metal sheath and
    b. a flexible metal core mounted for relative sliding longitudinal movement within the sheath,
    c. the sliding surfaces of both sheath and core being comprised of a precipitation hardening steel hardened to a predetermined degree of hardness by swaging and heat treating at a temperature of at least 600 F.
2. The actuator of claim 1 wherein the precipitation hardening steel comprises a maraging steel.
3. The actuator of claim 1 wherein the precipitation hardening steel comprises an austenitic steel.
4. The actuator of claim 1 wherein the steel is hardened by swaging and heat treating at a temperature of between about 900° F. and 1500° F.
5. The actuator of claim 1 wherein the flexible metal sheath comprises an inner contact member comprising spirally wound flat wire, a vapor barrier of heat-resistant tape wound over the contact member, a layer of round wires spirally wound over the vapor barrier, and a metal binder wire helically wound about the round wire layer and swaged thereto.
6. The actuator of claim 1 wherein the flexible metal core comprises a central wire wrapped with an armoring, precipitation hardened, steel wire swaged thereto.
7. A push-pull cable-type actuator for use at high temperatures, comprising:
    a. a flexible metal sheath, and
    b. a flexible metal core mounted for relative sliding longitudinal movement within the sheath,
    c. the sliding surfaces of both sheath and core being comprised of a precipitation hardening alloy steel comprising from 10—30 percent nickel, from 5—15 percent cobalt, from 1—10 percent molybdenum, and iron, hardened to a predetermined degree of hardness by swaging and heat treating at a temperature of at least 600° F.
8. A push-pull cable-type actuator for use at high temperatures, comprising:
    a. a flexible metal sheath, and
    b. a flexible metal core mounted for relative sliding longitudinal movement within the sheath,
    c. the sliding surfaces of both sheath and core being comprised of a precipitation hardening steel hardened to a predetermined degree of hardness by swaging and heat treating at a temperature of at least 600° F.
    d. at least one of said sliding surfaces comprising an alloy containing from 5—15 percent nickel, from 10—30 percent chromium, from 5—20 percent tungsten, from 1—10 percent iron, and cobalt, the alloy being fabricated in the soft condition and hardened by swaging and heating.